US 8,016,197 B2

(12) United States Patent
Furuyama et al.

(10) Patent No.: US 8,016,197 B2
(45) Date of Patent: Sep. 13, 2011

(54) CODE READING DEVICE, CODE READING PROGRAM STORAGE MEDIUM AND CODE READING METHOD

(75) Inventors: Takeshi Furuyama, Kanagawa (JP); Shinichi Yada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 582 days.

(21) Appl. No.: 12/128,651

(22) Filed: May 29, 2008

(65) Prior Publication Data

US 2009/0078766 A1     Mar. 26, 2009

(30) Foreign Application Priority Data

Sep. 26, 2007  (JP) .................................. 2007-249928

(51) Int. Cl.
*G06K 7/10* (2006.01)
(52) U.S. Cl. ..................................... 235/462.1; 235/454
(58) Field of Classification Search ............... 235/462.1; 382/109
See application file for complete search history.

(56) References Cited

U.S. PATENT DOCUMENTS

| | | | | |
|---|---|---|---|---|
| 6,577,761 | B1 * | 6/2003 | Kanno et al. | 382/167 |
| 7,304,670 | B1 * | 12/2007 | Hussey et al. | 348/241 |
| 2001/0015378 | A1 | 8/2001 | Watanabe et al. | |
| 2004/0164161 | A1 | 8/2004 | Iwaguchi et al. | |
| 2007/0071320 | A1 | 3/2007 | Yada | |
| 2007/0138286 | A1 | 6/2007 | Kamijoh et al. | |

FOREIGN PATENT DOCUMENTS

| | | |
|---|---|---|
| CN | 1983299 A | 6/2007 |
| JP | 5-62005 A | 3/1993 |
| JP | 06-337954 A | 12/1994 |
| JP | 08-305785 A | 11/1996 |
| JP | 9006885 A | 1/1997 |
| JP | 2000-099622 A | 4/2000 |
| JP | 2004-252905 A | 9/2004 |
| JP | 2006-259816 A | 9/2006 |
| JP | 2007-094584 A | 4/2007 |
| JP | 2007-213358 A | 8/2007 |

OTHER PUBLICATIONS

Japanese Office Action dated Jan. 5, 2010 for Japanese Appln. No. 2007-249928 and English-language translation.
Chinese Office Action dated Sep. 3, 2010 for corresponding Chinese patent application No. 200810130323.7.

* cited by examiner

*Primary Examiner* — Thien M. Le
*Assistant Examiner* — Sonji Johnson
(74) *Attorney, Agent, or Firm* — Sughrue Mion, PLLC

(57) ABSTRACT

A code reading device includes an acquisition section, a derivation section and a correction section. The acquisition section reads a two-dimensional code image and acquires image information representing the two-dimensional code image. The derivation section derives an image characteristic quantity representing a ratio between a number of white pixels and a number of black pixels for a pre-specified region of the image information acquired by the acquisition section. The correction section, on the basis of a result of comparison of the image characteristic quantity derived by the derivation section with a reference value corresponding to the pre-specified region, applies correction to the image information to bring the image characteristic quantity closer to the reference value.

11 Claims, 10 Drawing Sheets

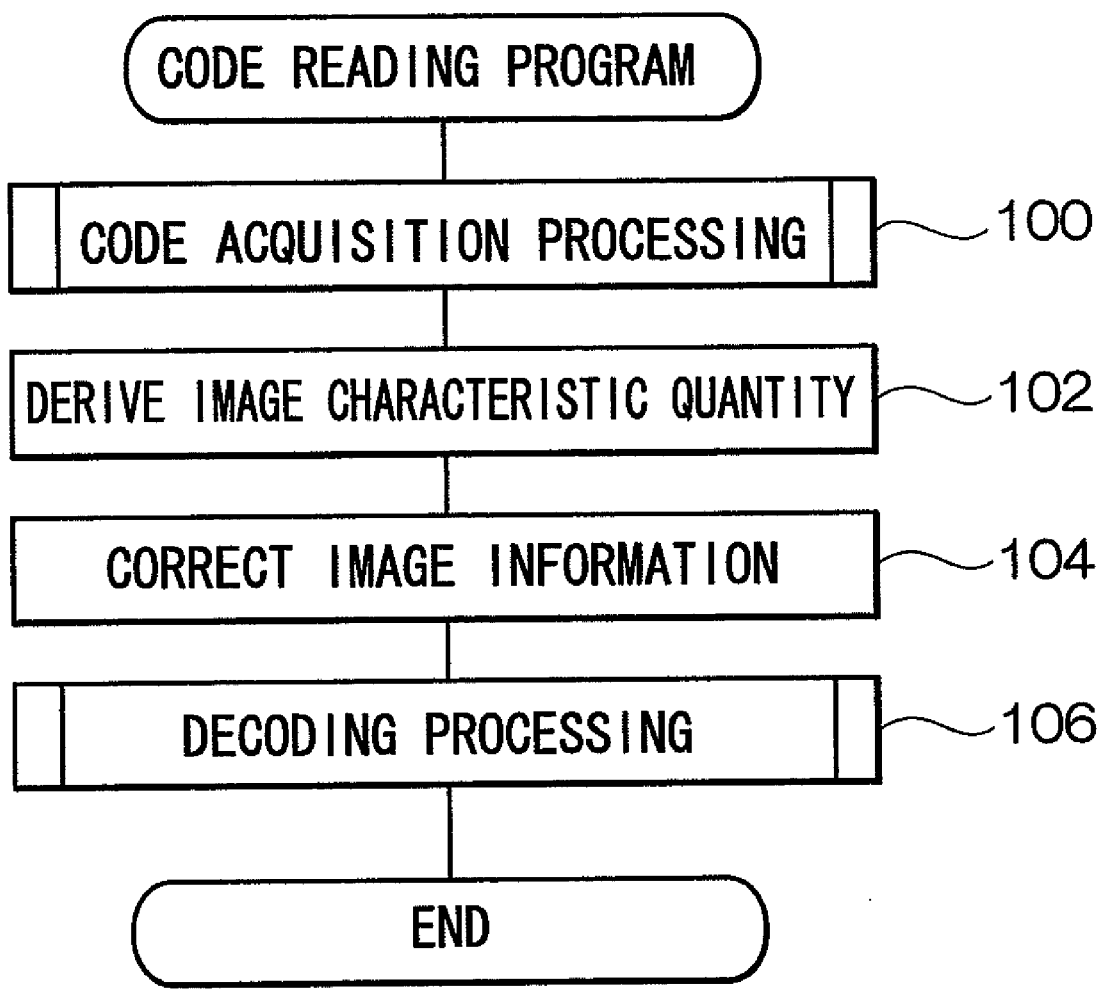

CODE READING DEVICE, CODE READING PROGRAM STORAGE MEDIUM AND CODE READING METHOD

CROSS-REFERENCE TO RELATED APPLICATION

This application is based on and claims priority under 35 USC 119 from Japanese Patent Application No. 2007-249928, filed Sep. 26, 2007.

BACKGROUND

1. Technical Field

The present invention relates to a code reading device, a code reading program storage medium, and a code reading method.

2. Related Art

Techniques have been proposed in relation to preventing a misreading of information recorded in a one-dimensional bar code, which is caused by the bars and spaces that constitute the one-dimensional bar code broadening to be broader than an original breadth or narrowing to be narrower than the original breadth.

SUMMARY

According to an aspect of the present invention, there is provided a code reading device comprising: an acquisition section that reads a two-dimensional code image and acquires image information representing the two-dimensional code image; a derivation section that derives an image characteristic quantity representing a ratio between a number of white pixels and a number of black pixels for a pre-specified region of the image information acquired by the acquisition section; and a correction section that, on the basis of a result of comparison of the image characteristic quantity derived by the derivation section with a reference value corresponding to the pre-specified region, applies correction to the image information to bring the image characteristic quantity closer to the reference value.

BRIEF DESCRIPTION OF THE DRAWINGS

Exemplary embodiments of the present invention will be described in detail based on the following figures, wherein:

FIG. 4 is a flowchart showing a flow of processing of a code reading program relating to the first exemplary embodiment.

DETAILED DESCRIPTION

Herebelow, exemplary embodiments of the present invention will be described in detail with reference to the drawings. In the following, descriptions will be given for a case of application of the present invention to a digital multifunction device (below referred to as a multifunction device).

First Exemplary Embodiment

Firstly, exterior structure of a multifunction device 10 relating to the present exemplary embodiment will be described.

Figure 1:
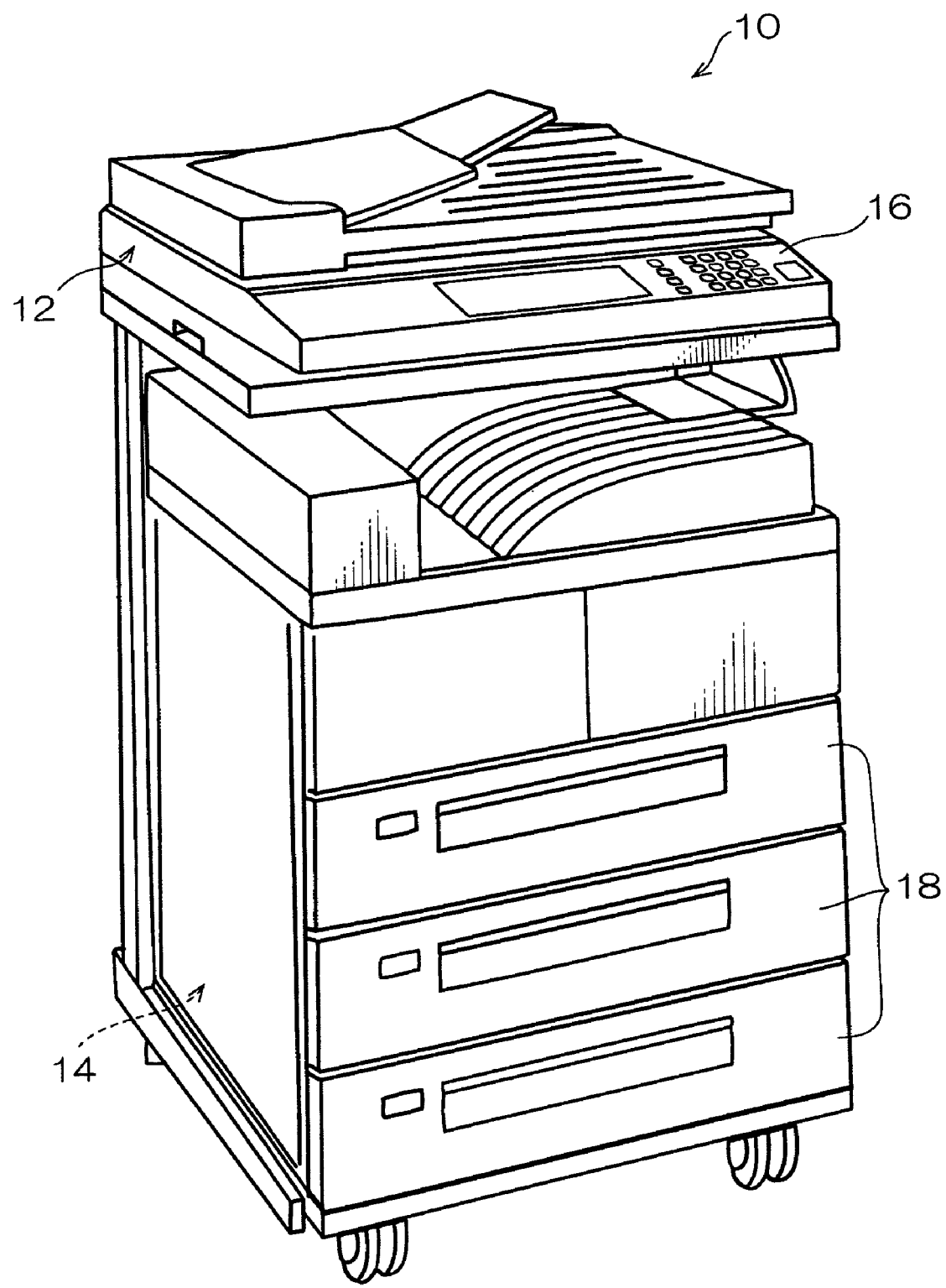
FIG. 1 is an exterior view showing the exterior of a multifunction device relating to a first exemplary embodiment.

As shown in FIG. 1, the multifunction device 10 is structured to include an image reading section 12 and an image forming section 14. The image reading section 12 acquires image information representing an image recorded at the surface of an original. The image forming section 14 is provided below the image reading section 12, and forms an image at the surface of a recording medium on the basis of image information.

The image reading section 12 is provided with a transparent platen, on an upper surface of which an original (document) is placed, and a light scanning device, in a space below the platen, that moves while illuminating light at the original. The image reading section 12 opto-electronically converts light that has been illuminated from the light scanning device, reflected at the surface of the original and read by a CCD (charge coupled device) line sensor, and thus acquires image information representing an image recorded at the surface of the original.

The image reading section 12 is also provided with a control panel 16, for input by a user of various instructions, such as original reading or copying instructions and the like. The control panel 16 is provided with a touch panel display, which displays a condition setting screen for implementing settings of various conditions for when copying, control switches for controlling the multifunction device 10, and the like.

The image forming section 14 is provided with a photosensitive drum. A charging apparatus, a light scanning apparatus, a development apparatus, a transfer apparatus and the like are provided around the photosensitive drum. A peripheral surface of the photosensitive drum is uniformly electrostatically charged by the charging device, and then an electrostatic latent image is formed on the basis of image information, by the light scanning device irradiating light in accordance with the image information. The electrostatic latent image that has been formed is developed with toner supplied by the developing device, to form a toner image. Thereafter, the toner image on the photosensitive drum is transferred by the transfer apparatus to recording paper which has been conveyed from a paper supply tray 18. The recording paper to which the image has been transferred is subjected to heating and pressure treatment by a fixing apparatus, and thus an image is fixed to the recording paper, and this is ejected.

Figure 2:
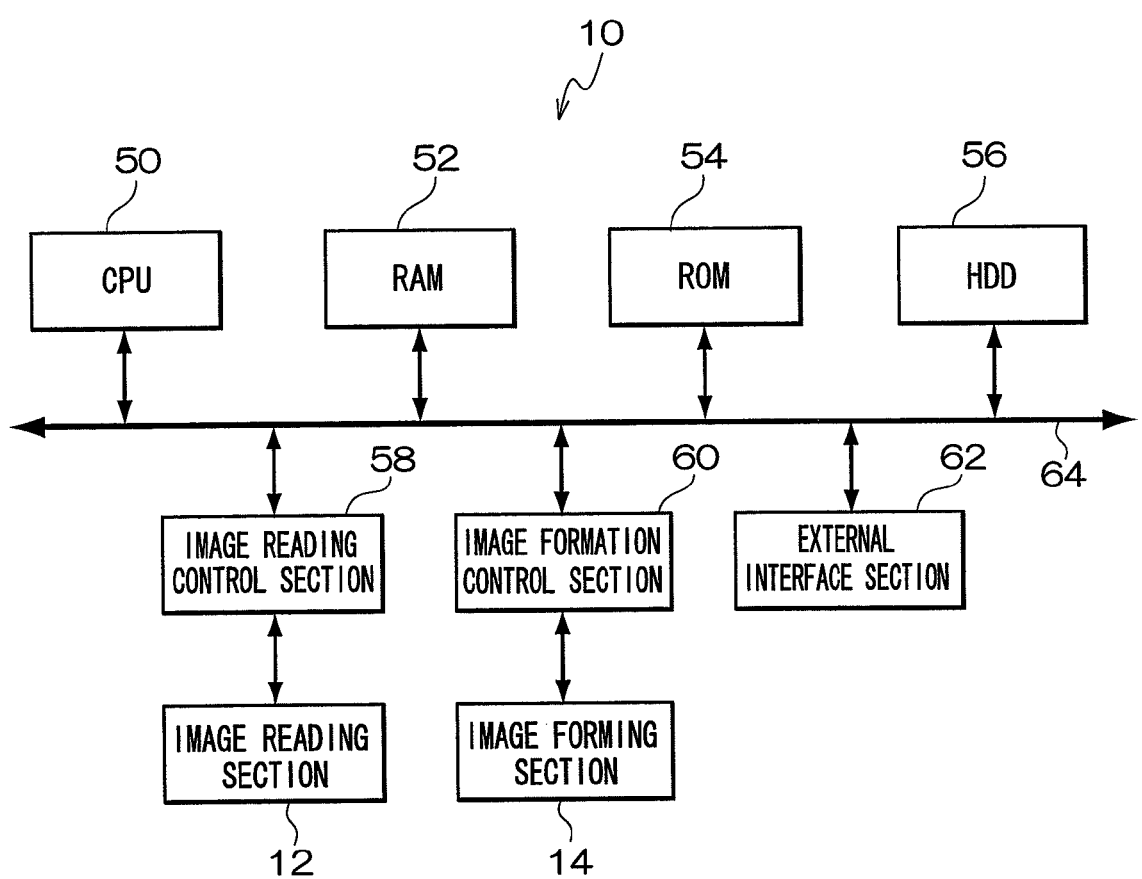
FIG. 2 is a block diagram showing principal structures of an electronic system of the multifunction device relating to the first exemplary embodiment.

FIG. 2 shows principal structures of an electronic system of the multifunction device 10 relating to the present exemplary embodiment.

As shown in FIG. 2, the multifunction device 10 is structured to include a CPU (central processing unit) 50, which administers operations of the device as a whole, a RAM (random access memory) 52, which temporarily stores various kinds of information, a ROM (read-only memory) 54, in which a control program for controlling the multifunction device 10 and various other programs and the like are stored in advance, and an HDD (hard disk drive) 56, which stores various kinds of information.

The multifunction device 10 is also provided with an image reading control section 58, an image formation control section 60 and an external interface section 62. The image reading control section 58 is connected to the above-described image reading section 12 and controls optical reading of images by the image reading section 12. The image formation control section 60 is connected to the image forming section 14 and controls formation of images by the image forming section 14. The external interface section 62 is connected to a network and implements communications of information with other devices connected to the network.

The CPU 50, the RAM 52, the ROM 54, the HDD 56, the image reading control section 58, the image formation control section 60 and the external interface section 62 are connected to one another through a system bus 64. Hence, the CPU 50 may implement access to the RAM 52, the ROM 54 and the HDD 56, control operations of the image reading section 12 via the image reading control section 58, control operations of the image forming section 14 via the image formation control section 60, and control communications of information through the external interface section 62.

Now, the CPU 50 is capable of reading code images recorded at originals, by executing a code reading program which will be described below. For the present exemplary embodiment, a case will be described in which a code that is read by the code reading program is deployed as a QR code (registered trademark), which is a two-dimensional code (a two-dimensional symbol).

Next, operation of the multifunction device 10 relating to the present exemplary embodiment will be described.

Figure 3A:
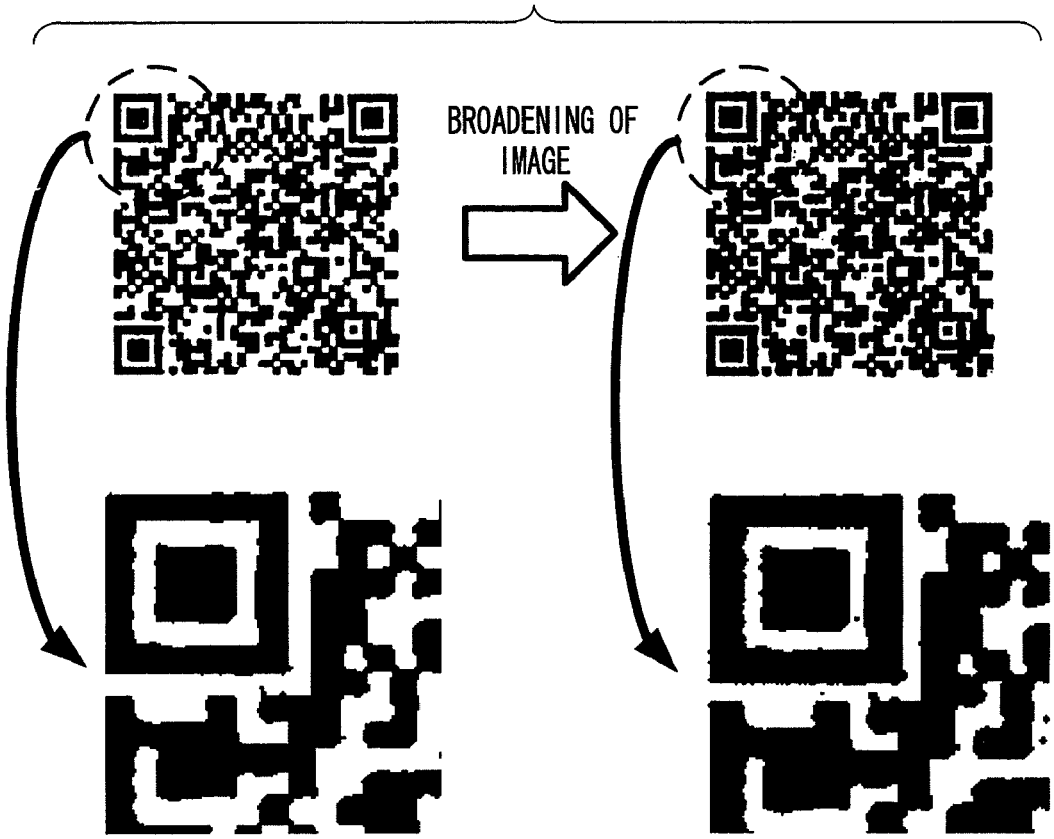
FIG. 3A and FIG. 3B are diagrams providing descriptions of broadening and narrowing of a code image relating to the first exemplary embodiment.
Figure 3B:
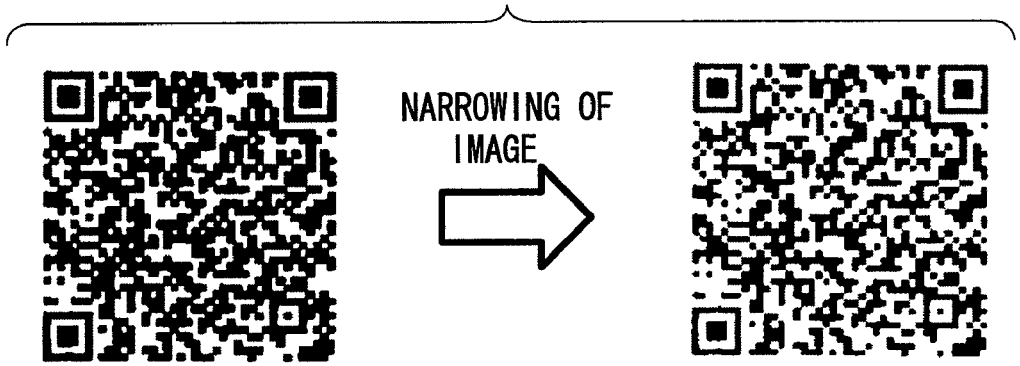

When, for example, repeatedly performing transmission/reception with a facsimile device, reading with a scanner or the like, of originals at which code images are formed, there may be cases in which the code images are broadened to be broader than an original breadth as shown in FIG. 3A, or the code images are narrowed to be narrower than the original breadth, as shown in FIG. 3B. The code reading processing relating to the present exemplary embodiment is processing for reading code images in which such broadening or narrowing has occurred and decoding the code images.

Firstly, referring to FIG. 4, code reading processing which is executed by the multifunction device 10 in order to decode information that has been coded (encoded) as a two-dimensional code will be described. FIG. 4 is a flowchart showing a flow of processing of the code reading program, which is executed by the CPU 50 when an execution instruction for decoding of a code image is inputted via the control panel 16 at a time of reading by the image reading section 12 of an original which includes the code image. This program is stored in advance in a predetermined region of the ROM 54.

First, in step 100, code acquisition processing is executed, which reads the code image included in the image recorded at the original and acquires image information representing this code image.

Figure 5A:
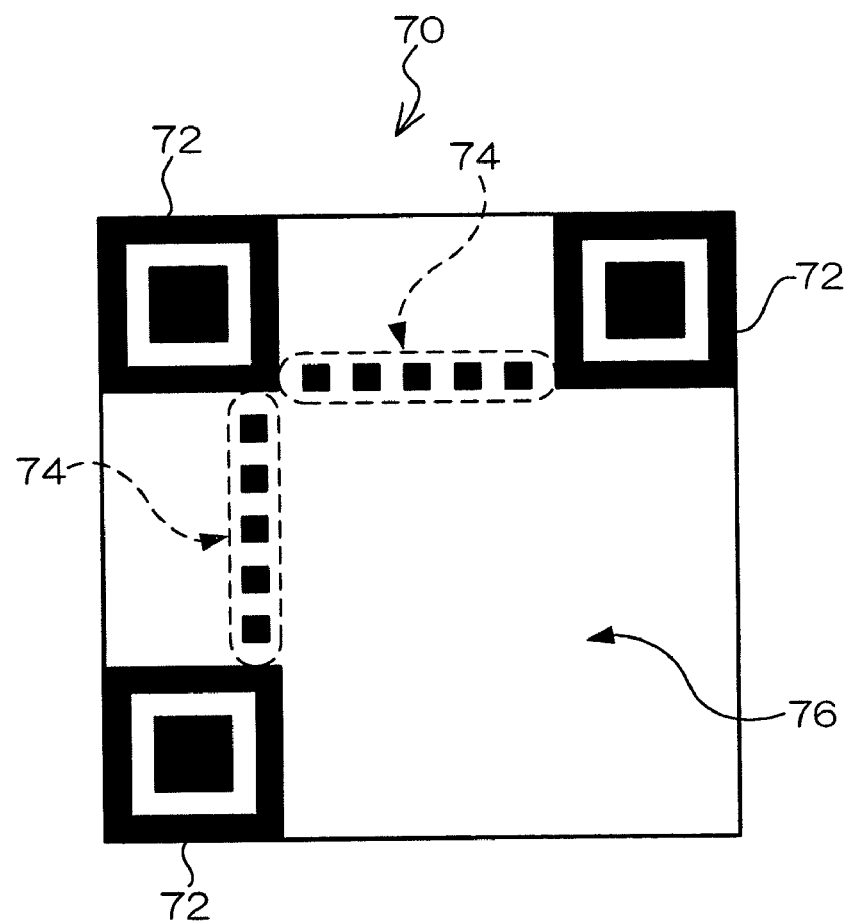
FIG. 5A and FIG. 5B are diagrams showing a code image relating to the first exemplary embodiment.
Figure 5B:
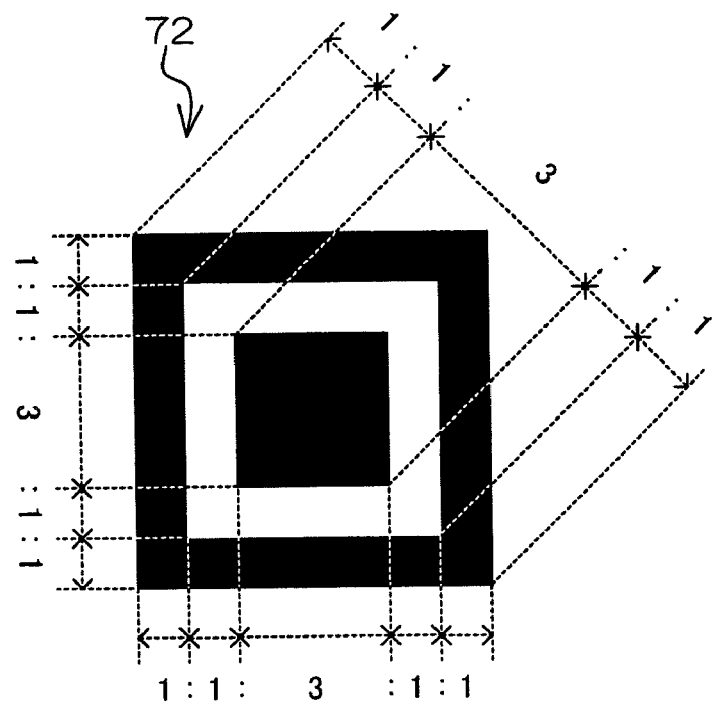

Now, referring to FIG. 5A and FIG. 5B, the code will be described. FIG. 5A is a code image 70 representing the code. Modules which are rectangles of white (bright) or black (dark) serve as minimum units, and the code image 70 is constituted by plural modules being arrayed in a two-dimensional form. For the white referred to here, the ground color of a recording paper is generally used. Basic specifications of the code are standardized under JIS (JIS-X-0510). A ratio of areas of the white modules and the black modules occupying the whole area of the code is set at approximately 1:1.

The code image 70 is structured to include position detection patterns 72, timing codes 74 and a code region 76.

The position detection patterns 72 are for showing the position of the code image. As shown in FIG. 5B, in each position detection pattern 72, a white rectangular region is contained in a first black rectangular region, and a second black rectangular region is contained in the white rectangular region. As represented by image information that represents a portion reaching from one end portion of the position detection pattern 72 through the center thereof to another end portion thereof, one width of the first black rectangular region, one width of the white rectangular region, the width of the second black rectangular region, the other width of the white rectangular region, and the other width of the first black rectangular region have the relationship 1:1:3:1:1 or approximately 1:1:3:1:1.

The timing codes 74 are for identifying co-ordinates within the code. In each timing code 74, white modules and black modules are alternately disposed with equal spacing.

The code region 76 is a region at two edges of which the position detection patterns 72 and the timing codes 74 are adjacent. Information is coded and recorded as white modules and black modules in the code region 76.

The code acquisition processing that is executed in step 100 first detects regions in which widths of black-white-black-white-black are at 1:1:3:1:1 or approximately 1:1:3:1:1 as being the position detection patterns 72.

A tolerance value of the widths of the above-described regions is 0.5. For example, a range of 0.5 to 1.5 is a tolerance value for one module, and a range of 2.5 to 3.5 is a tolerance value for three modules. Therefore, if broadening or narrowing occurs in the code image 70 and the broadening or narrowing of the code image 70 is extreme and the widths of the regions of black-white-black-white-black representing the position detection patterns 72 are outside the tolerance value ranges, then even though images which are the original position detection patterns 72 are present, they cannot be detected as being the position detection patterns 72 and, as a result, the code is not detected.

Then, in the code reading processing, when the three position detection patterns 72 have been detected, a region enclosed by a square of which the three position detection patterns 72 are three corner points is detected as being the code. The region detected as being the code is acquired as image information representing the code.

In step 102, for a pre-specified region of the image information acquired by the code acquisition processing executed in step 100, an image characteristic quantity, which represents a ratio between a number of white pixels and a number of black pixels, is derived.

The pre-specified region from which the image characteristic quantity of the present exemplary embodiment is derived is the whole of the image region. However, the pre-specified region from which the image characteristic ratio is derived is not limited to the whole of the image region and may be a region of the position detection patterns 72 or a region of the timing codes 74.

Next, in step 104, code correction processing is executed which, on the basis of a result of comparison of the image characteristic quantity derived by the processing of step 102 with a reference value corresponding to the pre-specified region, applies correction to the image information acquired by the code acquisition processing of step 100 to bring the image characteristic quantity closer to the reference value.

The code correction processing relating to the present exemplary embodiment implements broadening processing (expansion processing) which broadens black regions represented by the image information, or narrowing processing (contraction processing) which narrows the black regions represented by the image information.

In the present exemplary embodiment, the whole of the image region is used as the pre-specified region. The reference value corresponding to the whole of the image region is set to the ratio of pixel numbers of white regions and black regions represented by the image information being 1:1 or approximately 1:1. This is because it is specified by the standards that the area ratio of white modules and black modules occupying the whole region of the code will be approximately 1:1.

Now the code correction processing will be more specifically described. For example, in a case in which the ratio of pixel numbers of white regions and pixel numbers of black regions represented by the image characteristic quantity is 7:3, in order to bring the ratio of the pixel numbers of white regions and pixel numbers of black regions closer to the reference value 1:1 or approximately 1:1, narrowing processing is performed to reduce pixels of black regions by 20% over the whole of the image information. Accordingly, pixels of white regions are increased by 20% over the whole of the image information by the narrowing processing. For example, if black modules constituting the code image 70 that is the subject of correction are represented by 7 pixels in each of a vertical direction and a horizontal direction, and pixel numbers representing white modules are represented by three pixels in the vertical direction and horizontal direction, then over the whole of the image information single rows of black pixels that neighbor a white module at left, right, top or bottom are converted to white. That is, the white modules are expanded and the black modules are contracted by the code correction processing.

Alternatively, if a region of the timing codes 74 is used as the pre-specified region, the reference value corresponding to the region of the timing codes 74 is set to a ratio of pixel numbers of white regions and black regions represented by the image information that represents the region of the timing codes 74 being 1:1 or approximately 1:1. This is because the timing code 74 has white modules and black modules alternatingly arranged.

Now the code correction processing will be more specifically described for a case in which the region of the timing codes 74 is used as the pre-specified region and the image characteristic quantity differs from the reference value. In such a case, a number of pixels that will represent one of the modules structuring the timing code 74 after the correction is calculated from: (an average of pixel numbers constituting individual black modules in the region for which the image characteristic quantity is acquired +an average of pixel numbers constituting individual white modules in the region for which the image characteristic quantity is acquired)/2. Then, with this calculated value serving as a reference pixel count, broadening processing or narrowing processing is applied to the black regions, with a difference between an average of pixel numbers representing individual black modules that constitute the region of the timing codes 74 and the reference pixel count serving as an increase/reduction amount of the black pixels representing the image information.

For example, if pixel numbers representing the black modules and white modules alternatingly arranged in the timing code 74 represented by the image characteristic quantity derived by step 102 are 8 (black), 12 (white), 8 (black), 12 (white), . . . 8 (black), 12 (white), then the reference pixel count is 10. In this case, the average of pixels constituting the black modules is 8. Therefore, broadening processing is performed to increase the pixel numbers constituting the black modules by 2.

Alternatively, in a case in which the region of the position detection patterns 72 is used as the pre-specified region, the reference value corresponding to the region of the position detection patterns 72 is set to the ratios of the one width of the first black rectangular region, the one width of the white rectangular region, the width of the second black rectangular region, the other width of the white rectangular region, and the other width of the first black rectangular region being 1:1:3:1:1 or approximately 1:1:3:1:1. Then, in the case in which the region of the position detection patterns 72 is used as the pre-specified region, a method for finding an increase/reduction amount of pixels for code correction processing is similar to the case of using a region of the timing codes 74 as the pre-specified region.

If the increase/reduction amount of pixels that is found by the code correction processing relating to the present exemplary embodiment is not an integer, an integer value increase/reduction amount that is closest to the increase/reduction amount that has been found is used.

Then, in step 106, conventional publicly known decoding processing for decoding the coded information is executed, and the present program ends. The decoding processing is applied to the code region 76 of the image information which has been corrected by the code correction processing executed in step 104.

When the code reading processing ends, the image information acquired by the code acquisition processing that was executed in step 100 is replaced with the corrected image information.

Second Exemplary Embodiment

For a second exemplary embodiment, an example will be described of a case in which, even if the decoding of the corrected image information by the decoding processing fails, the decoding is repeatedly performed until successful. Structures of the multifunction device 10 relating to the second exemplary embodiment are the same as those relating to the first exemplary embodiment (see FIG. 1 and FIG. 2), and will not be described.

Now, operation of the multifunction device 10 relating to the second exemplary embodiment will be described.

Figure 6:
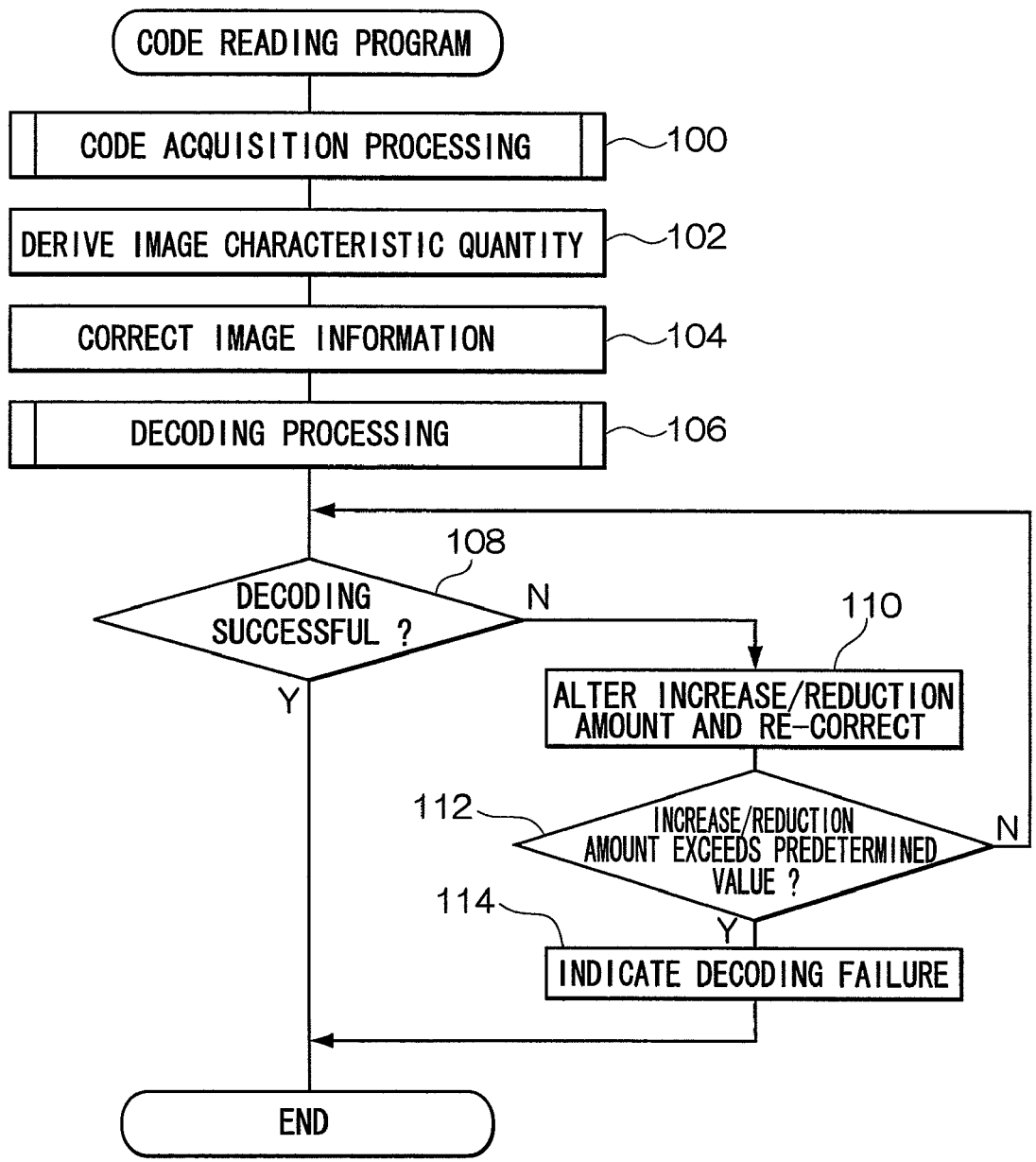
FIG. 6 is a flowchart showing a flow of processing of a code reading program relating to a second exemplary embodiment.

First, referring to FIG. 6, code reading processing, which is executed by the multifunction device 10 in order to decode information that has been coded as a two-dimensional bar code relating to the present exemplary embodiment, will be described. FIG. 6 is a flowchart showing a flow of processing of a code reading program, which is executed by the CPU 50 when an execution instruction for decoding of the code image 70 is inputted via the control panel 16 at a time of reading by the image reading section 12 of an original which includes the code image. This program is stored in advance in a predetermined region of the ROM 54. Here, steps that are the same as in the flowchart of FIG. 4 relating to the first exemplary embodiment will be described only in relation to additional steps, and other steps that are the same will be assigned the same reference numerals and will not be described.

In step 108, it is judged whether or not the decoding processing executed in step 106 has been successful. If this judgement is negative, the processing advances to step 110, and if the judgement is positive, the present program ends.

In step 110, the increase/reduction amount of black pixels is altered by a predetermined amount from the increase/reduction amount of pixels that was used in the previous correction of the image information. The image information acquired by the code acquisition processing of step 100 is corrected again on the basis of the altered increase/reduction amount.

Then, in step 112, it is judged whether or not a maximum value of the increase/reduction amounts of pixels used in the corrections of the image information has exceeded a predetermined value specified in advance. This predetermined value is a pre-specified ending condition for ending the correction, and is, for example, specified in advance by a user in accordance with the size of the image information. If this judgement is positive, the processing advances to step 114, and if the judgement is negative, the processing returns to step 108.

In step 114, an indication that decoding of the code has failed is displayed at the control panel 16, and the present program ends.

Third Exemplary Embodiment

For a third exemplary embodiment, an example will be described of a case in which, even if the decoding of the corrected image information by the decoding processing fails, the decoding is repeatedly performed until successful, and, when the decoding is being repeatedly performed, a different image characteristic quantity from the previous decoding is used. Structures of the multifunction device 10 relating to the third exemplary embodiment are the same as those relating to the first exemplary embodiment (see FIG. 1 and FIG. 2), and will not be described.

Operation of the multifunction device 10 relating to the third exemplary embodiment will be described.

Figure 7:
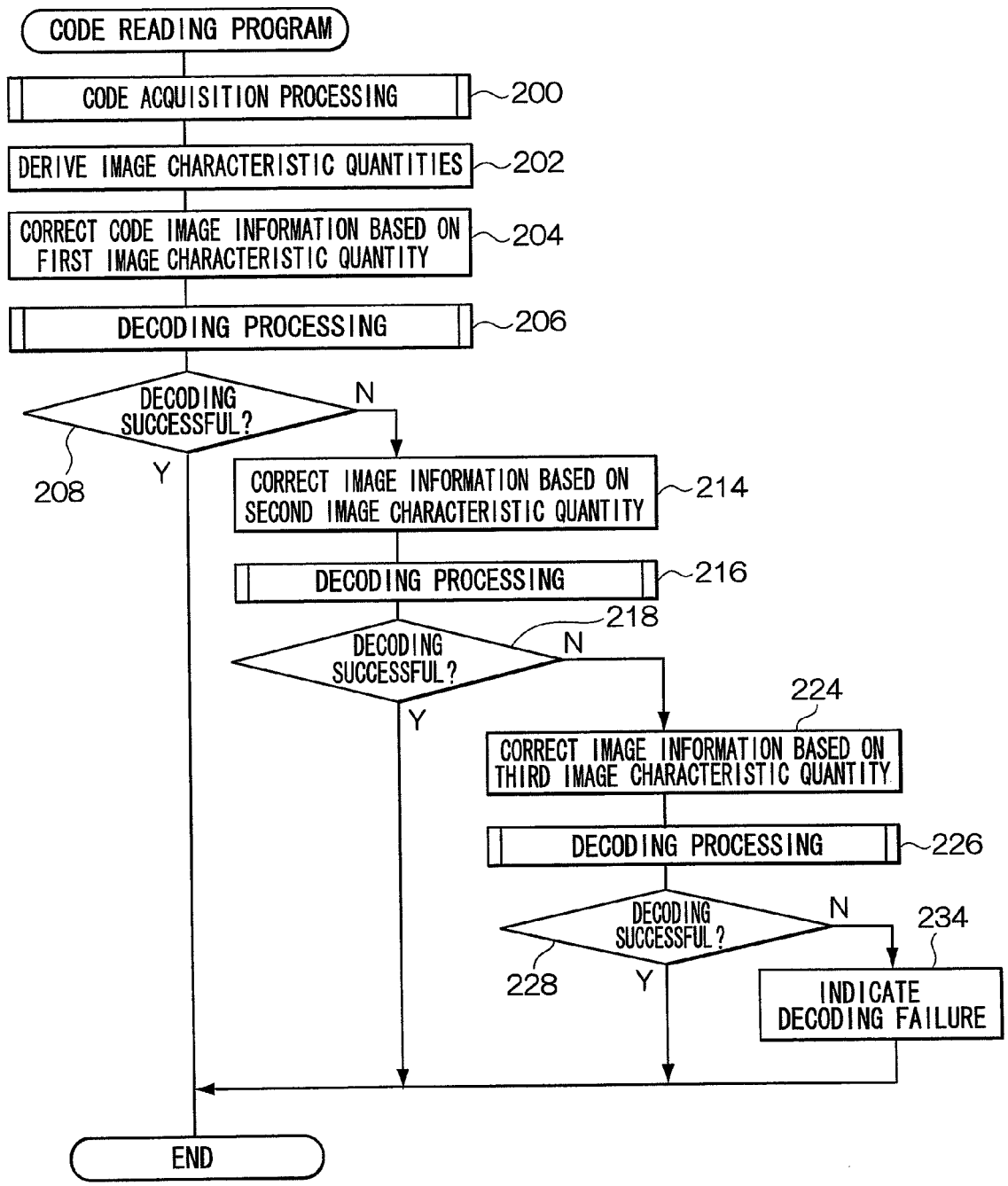
FIG. 7 is a flowchart showing a flow of processing of a code reading program relating to a third exemplary embodiment.

First, referring to FIG. 7, code reading processing, which is executed by the multifunction device 10 in order to decode information that has been coded as a two-dimensional bar code relating to the present exemplary embodiment, will be described. FIG. 7 is a flowchart showing a flow of processing of a code reading program, which is executed by the CPU 50 when an execution instruction for decoding of the code image 70 is inputted via the control panel 16 at a time of reading by the image reading section 12 of an original which includes the code image. This program is stored in advance in a predetermined region of the ROM 54.

First, in step 200, code acquisition processing is executed and image information representing the code is acquired.

Next, in step 202, for pre-specified regions of the image information acquired by the code acquisition processing executed in step 200, image characteristic quantities representing ratios between numbers of white pixels and numbers of black pixels are derived. In this third exemplary embodiment, an image characteristic quantity with the pre-specified region being the whole of the image information is derived to serve as a first image characteristic quantity, an image characteristic quantity with the pre-specified region being a region of the timing codes 74 is derived to serve as a second image characteristic quantity, and an image characteristic quantity with the pre-specified region being a region of the position detection patterns 72 is derived to serve as a third image characteristic quantity.

Next, in step 204, code correction processing is executed on the image information acquired in step 200, on the basis of a result of comparison of the first image characteristic quantity with a reference value corresponding thereto.

Then, in step 206, decoding processing is executed which decodes the coded information recorded at the code region 76 of the image information which has been corrected by the code correction processing executed in step 204.

Next, in step 208, it is judged whether or not the decoding processing executed in step 206 has been successful. If this judgement is negative, the processing advances to step 214, and if the judgement is positive, the present program ends.

In step 214, the code correction processing is executed on the image information acquired in step 200 on the basis of a result of comparison of the second image characteristic quantity with a reference value corresponding thereto.

Then, in step 216, the decoding processing is executed to decode the coded information recorded at the code region 76 of the image information which has been corrected by the code correction processing executed in step 214.

Then, in step 218, it is judged whether or not the decoding processing executed in step 216 has been successful. If this judgement is negative, the processing advances to step 224, and if the judgement is positive, the present program ends.

In step 224, the code correction processing is executed on the image information acquired in step 200 on the basis of a result of comparison of the third image characteristic quantity with a reference value corresponding thereto.

Then, in step 226, the decoding processing is executed to decode the coded information recorded at the code region 76 of the image information which has been corrected by the code correction processing executed in step 224.

Then, in step 228, it is judged whether or not the decoding processing executed in step 226 has been successful. If this judgement is negative, the processing advances to step 234, and if the judgement is positive, the present program ends.

In step 234, an indication that decoding of the code has failed is displayed at the control panel 16, and the present program ends.

Fourth Exemplary Embodiment

For a fourth exemplary embodiment, an example will be described of a case in which the repetition of correction relating to the second exemplary embodiment is combined with the repetition of correction relating to the third exemplary embodiment. Structures of the multifunction device 10 relating to the fourth exemplary embodiment are the same as those relating to the first exemplary embodiment (see FIG. 1 and FIG. 2), and will not be described.

Operation of the multifunction device 10 relating to the fourth exemplary embodiment will be described.

Figure 8A:
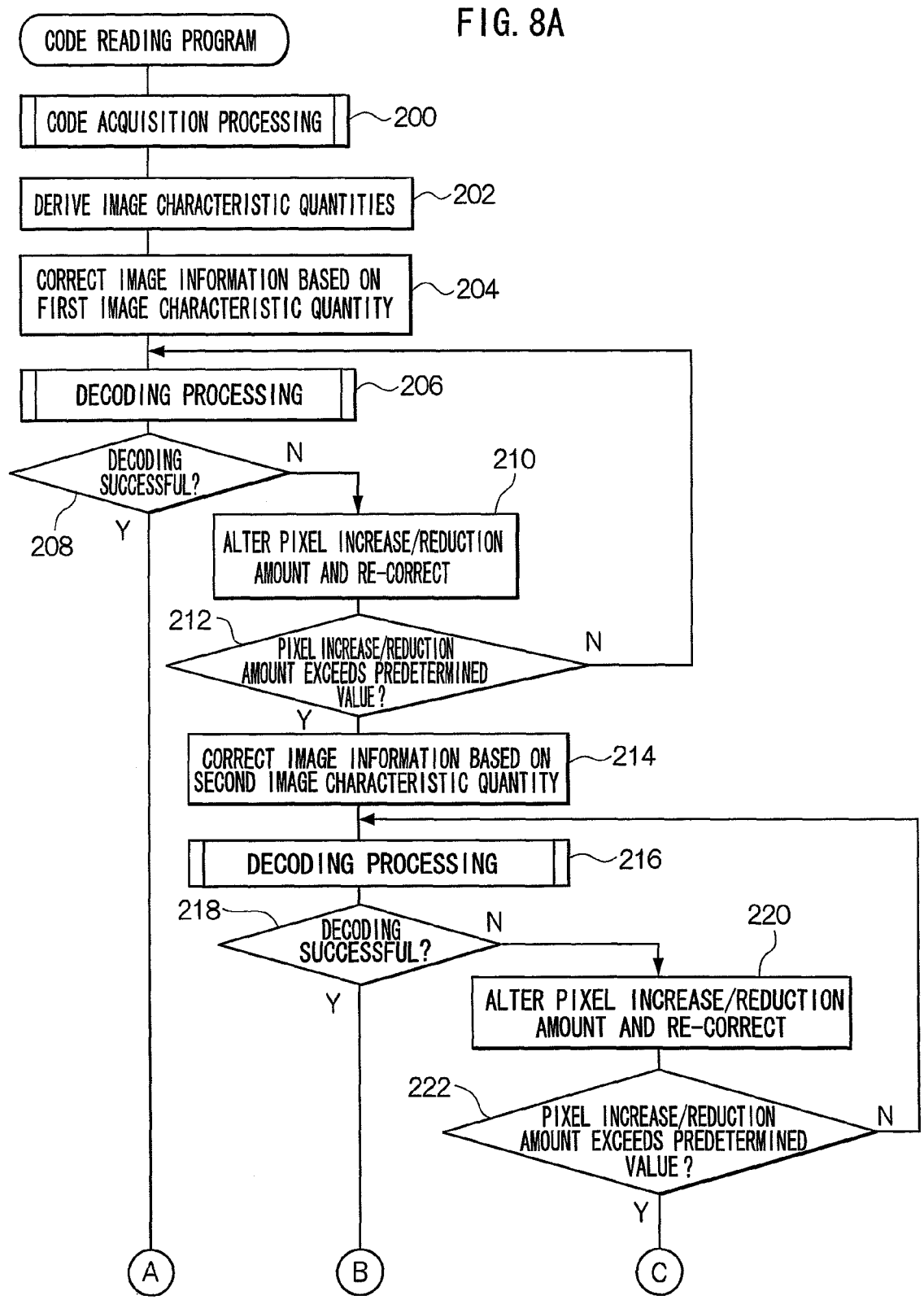
FIG. 8A and FIG. 8B are a flowchart showing a flow of processing of a code reading program relating to a fourth exemplary embodiment.
Figure 8B:
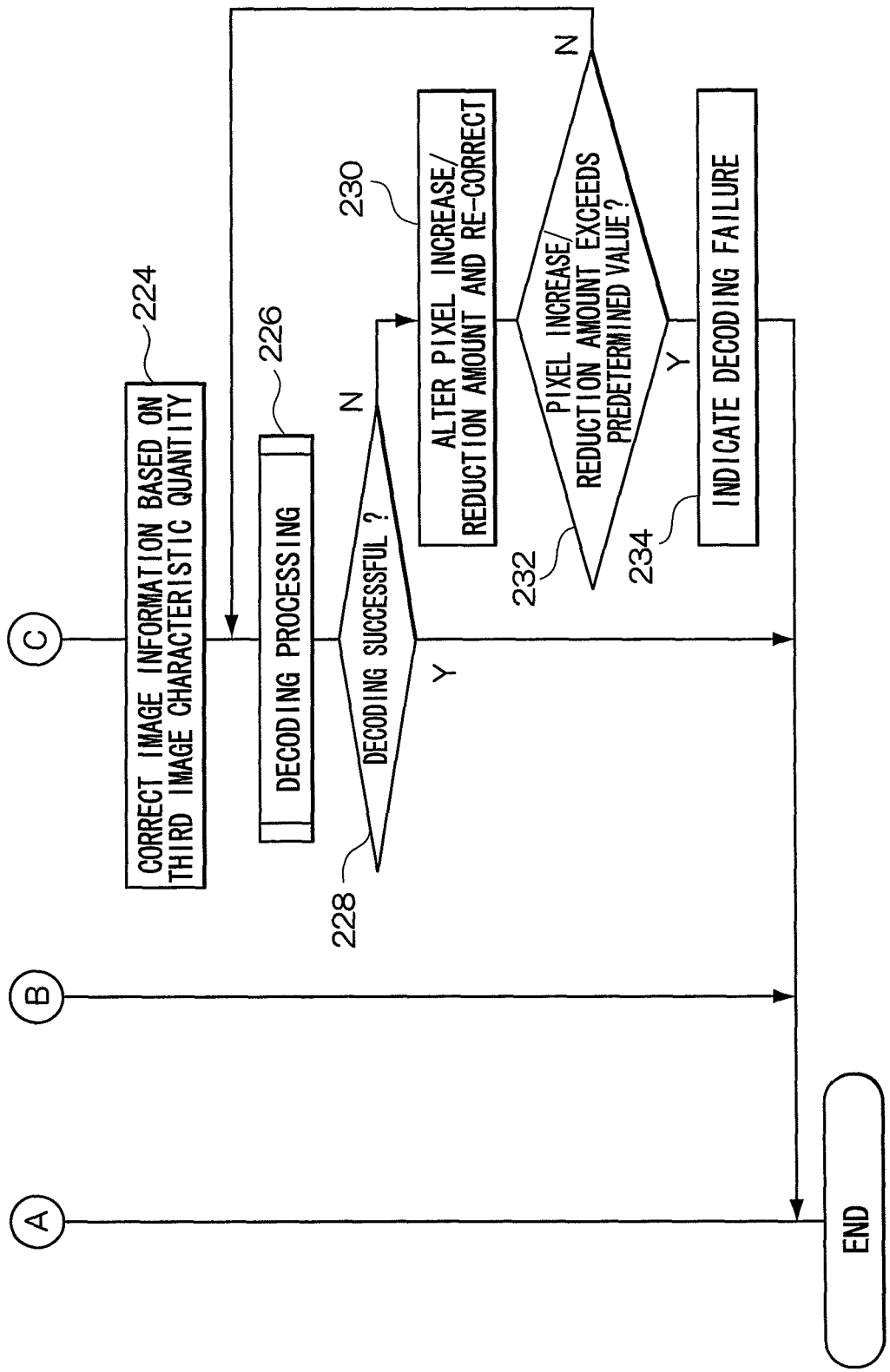

First, referring to FIGS. 8A and 8B, code reading processing which is executed by the multifunction device 10 in order to decode information that has been coded as a two-dimensional bar code relating to the present exemplary embodiment will be described. FIGS. 8A and 8b show a flowchart showing a flow of processing of a code reading program, which is executed by the CPU 50 when an execution instruction for decoding of the code image 70 is inputted via the control panel 16 at a time of reading by the image reading section 12 of an original which includes the code image. This program is stored in advance in a predetermined region of the ROM 54. Here, steps that are the same as in the flowchart of FIG. 7 relating to the third exemplary embodiment will be described only in relation to additional steps, and other steps that are the same will be assigned the same reference numerals and will not be described.

In step 208, it is judged whether or not the decoding processing executed in step 206 has been successful. If this judgement is negative, the processing advances to step 210, and if the judgement is positive, the present program ends.

In step 210, an increase/reduction amount of black pixels is altered by a predetermined amount from the increase/reduction amount of pixels that was used in the previous correction of the image information. The image information acquired by the code acquisition processing of step 200 is corrected again on the basis of the altered increase/reduction amount.

Next, in step 212, it is judged whether or not a maximum value of the increase/reduction amounts of pixels used in the corrections of the image information has exceeded a predetermined value specified in advance. If this judgement is positive, the processing advances to step 214, and if the judgement is negative, the processing returns to step 206.

In step 214, the code correction processing is executed on the image information acquired in step 200 on the basis of a result of comparison of the second image characteristic quantity with the reference value corresponding thereto.

Then, in step 216, the decoding processing is executed to decode the coded information recorded at the code region 76 of the image information which has been corrected by the code correction processing executed in step 214.

Then, in step 218, it is judged whether or not the decoding processing executed in step 216 has been successful. If this judgement is negative, the processing advances to step 220, and if the judgement is positive, the present program ends.

In step 220, an increase/reduction amount of black pixels is altered by a predetermined amount from the increase/reduction amount of pixels that was used in the previous correction of the image information. The image information acquired by the code acquisition processing of step 200 is corrected again on the basis of the altered increase/reduction amount.

Next, in step 222, it is judged whether or not a maximum value of the increase/reduction amounts of pixels used in the corrections of the image information has exceeded a predetermined value specified in advance. If this judgement is positive, the processing advances to step 224, and if the judgement is negative, the processing returns to step 216.

In step 224, the code correction processing is executed on the image information acquired in step 200 on the basis of a result of comparison of the third image characteristic quantity with the reference value corresponding thereto.

Then, in step 226, the decoding processing is executed to decode the coded information recorded at the code region 76 of the image information which has been corrected by the code correction processing executed in step 224.

Then, in step 228, it is judged whether or not the decoding processing executed in step 226 has been successful. If this judgement is negative, the processing advances to step 230, and if the judgement is positive, the present program ends.

In step 230, an increase/reduction amount of black pixels is altered by a predetermined amount from the increase/reduction amount of pixels that was used in the previous correction of the image information. The image information acquired by the code acquisition processing of step 200 is corrected again on the basis of the altered increase/reduction amount.

Next, in step 232, it is judged whether or not a maximum value of the increase/reduction amounts of pixels used in the corrections of the image information has exceeded a predetermined value specified in advance. If this judgement is positive, the processing advances to step 234, and if the judgement is negative, the processing returns to step 226.

In step 234, an indication that decoding of the code has failed is displayed at the control panel 16, and the present program ends.

Hereabove, the present invention has been explained using the above exemplary embodiments. However, the technical scope of the present invention is not limited to the scope of the descriptions in the above exemplary embodiments. Numerous modifications and improvements may be applied to the above exemplary embodiments within a scope not departing from the spirit of the invention, and the technical scope of the present invention includes modes in which these modifications and improvements are applied.

Moreover, the above exemplary embodiments are not limiting to the invention described in the claims, and not all of the combinations of characteristics described in the above exemplary embodiments are necessarily required in means for resolution of the invention. Inventions with various stages of the exemplary embodiments described above are to be included, and various inventions can be derived by combining the plural structural conditions that are disclosed. Even if some structural element is removed from the totality of structural elements illustrated in the above exemplary embodiments, as long as the effect thereof is provided, a structure from which the some structural element has been removed may be derived to serve as the invention.

For example, for the above exemplary embodiments, cases have been described in which the code reading program is stored at the ROM 54. However, the present invention is not limited thus, and modes may be formed in which the code reading program is stored at the HDD 56.

Furthermore, for the above exemplary embodiments, cases have been described in which the code correction processing performs broadening processing and narrowing processing on black regions representing image information. However, the present invention is not limited thus. For example, the following may be formed: a mode in which correction of the image information is performed by resolution altering processing which alters a resolution of the image information on the basis of a result of comparison of an image characteristic quantity with a reference value; a mode in which correction of the image information is performed by filtering processing of colors of the pixels representing the image information, which sets colors to white where brightness is above a predetermined threshold or the like, and a threshold value that is used in the filtering processing is altered on the basis of a result of comparison of an image characteristic quantity with a reference value; and the like.

For the above exemplary embodiments, cases have been described in which the code correction processing performs broadening processing and narrowing processing on black regions representing image information. However, the present invention is not limited thus. A mode may also be formed in which broadening processing and narrowing processing are performed on white regions representing image information.

Figure 9:
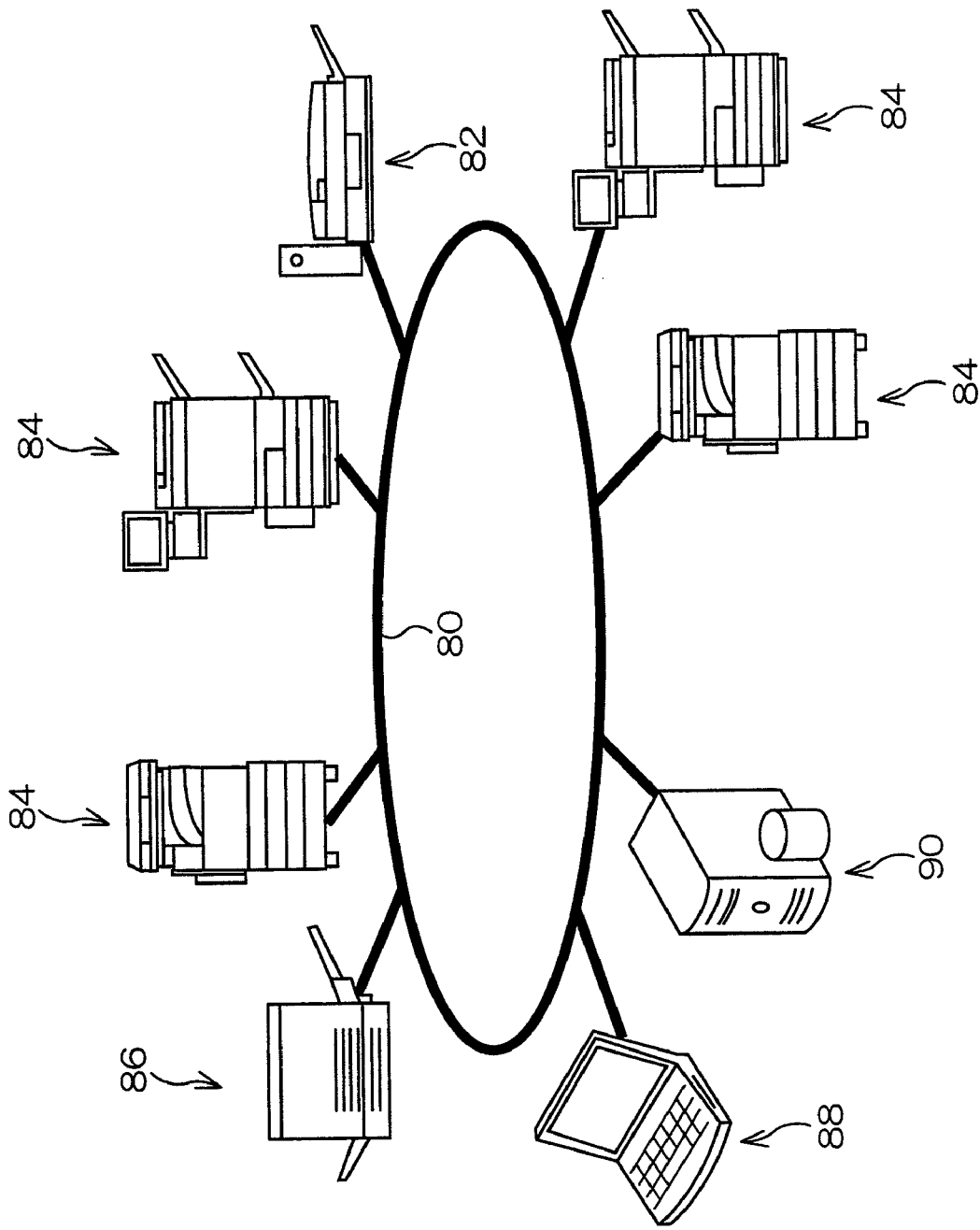
FIG. 9 is a diagram providing a description of a variant example with a distributed structure, in which the present invention utilizes devices connected to a network.

For the above exemplary embodiments, cases have been described in which the present invention is a single structure in the multifunction device 10. However, the present invention is not limited thus. As shown in FIG. 9, a distributed structure may be formed in which the present invention is deployed in a network system in which a scanner 82, a copier 84, a printer 86, a computer 88 and a server 90 are connected. In such a case, a mode may be formed in which the original that includes the two-dimensional code image is read by the scanner 82 or the copier 84 to acquire image information representing the two-dimensional code image, then the acquired image information is transmitted to the computer 88 connected to a network 80, and the code correction processing and the decoding processing of the corrected image information are executed at the computer 88. A mode may also be formed in which the present invention is a single structure in the scanner 82 connected to the network 80.

When the present invention is applied to the network system shown in FIG. 9, a mode may be formed in which, when text information created at the computer 88 is formed on recording paper by the printer 86 and then the recording paper is copied by the copier 84, the copier 84 forms the code image 70, in which information is coded for identifying a copying history of the recording paper, at the new recording paper produced by the copying. The copier used for the copying transmits the copying history to the server 90, and the server 90 stores the copying history. When a copying history is to be checked, the code image 70 is read by the multifunction device 10, scanner 82 or the like at which the present invention is deployed, information coded and recorded in this code image 70 is decoded, and the copying history stored in the server 90 can be checked by accessing the server 90 in accordance with this information.

Modes may be formed in which the present invention is a single structure in an information device with photographic capabilities, such as a personal computer, a digital electronic still camera, a digital video camera, a portable telephone, a PDA (a personal digital assistant, which is a portable information terminal), or the like.

Obviously, the structure of the multifunction device 10 described for the above exemplary embodiments (FIG. 1 and FIG. 2) is an example, portions that are not required may be removed within a scope not departing from the spirit of the present invention, and new portions may be added.

Further yet, the flows of processing of the code reading programs described for the above exemplary embodiments (see FIG. 4, FIG. 6, FIG. 7, and FIGS. 8A and 8B) are examples, and obviously, within a scope not departing from the spirit of the present invention, unnecessary steps may be removed, new steps may be added, and processing sequences may be rearranged.

For the code reading program relating to the above exemplary embodiments, a mode in which the program is pre-installed in the multifunction device 10, a mode in which the program is provided in a condition of being stored at a computer-readable storage medium, a mode in which the code reading program is transmitted through a communication unit, wirelessly or by wire, and the like may be employed.

Further, for the above exemplary embodiments, cases have been described in which the code reading processing is realized by software structures according to a computer program. However, the present invention is not limited thus, and a mode in which the processing is realized by a hardware structure may be formed.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A code reading device comprising:
   an acquisition section that reads a two-dimensional code image and acquires image information representing the two-dimensional code image;
   a derivation section that derives an image characteristic quantity representing a ratio between a number of pixels of a white region and a number of pixels of a black region for a pre-specified region of the image information acquired by the acquisition section;
   a correction section that, on the basis of a result of comparison of the image characteristic quantity derived by the derivation section with a reference value corresponding to the pre-specified region, applies correction to the image information to at least one of increase or decrease the number of pixels of the white region or the number of pixels of the black region to bring the image characteristic quantity closer to the reference value; and
   a decoding section that decodes information which has been coded and recorded in the image information,
   wherein if decoding by the decoding section of the corrected image information by the correction section fails, the correction section repeatedly applies correction to at least one of increase or decrease the number of pixels of the white region or the number of pixels of the black region while changing an increase/decrease amount so as to bring the image characteristic quantity closer to the reference value with respect to the image information, and stops repeatedly applying the correction when the increase/decrease amount exceeds a pre-specified value.

2. The code reading device of claim 1, wherein the pre-specified region is the whole of the image information, and
   the reference value is a ratio of pixel numbers of white regions and black regions represented by the image information being approximately 1:1.

3. The code reading device of claim 1, wherein the two-dimensional code includes a timing code region in which white rectangular regions of a minimum unit constituting the two-dimensional code and black rectangular regions of the minimum unit are alternately disposed with equal spacing, and which identifies coordinates within the two-dimensional code,
   the pre-specified region includes the timing code region, and
   the reference value is a ratio of pixel numbers of white regions and black regions represented by the image information that represents the timing code region being approximately 1:1.

4. The code reading device of claim 1, wherein the two-dimensional code includes a position detection pattern region in which a white rectangular region is contained in a first black rectangular region, and a second black rectangular region is contained in the white rectangular region, and which represents a position of the two-dimensional code image,
   the pre-specified region includes the position detection pattern region, and
   the reference value is ratios of pixel numbers, represented by image information that represents a portion reaching from one end portion of the position detection pattern region through a center thereof to another end portion thereof, of one width of the first black rectangular region, one width of the white rectangular region, a width of the second black rectangular region, another width of the white rectangular region, and another width of the first black rectangular region being approximately 1:1:3:1:1.

5. The code reading device of claim 1, wherein the correction section applies the correction to bring the image characteristic quantity closer to the reference value by one of broadening processing which broadens black regions represented by the image information and narrowing processing which narrows black regions represented by the image information.

6. The code reading device of claim 1, wherein the derivation section derives a plurality of image characteristic quantities for a plurality of different pre-specified regions of the image information,
   if decoding by the decoding section of the corrected image information with one of the plurality of image characteristic quantities fails, the correction section applies correction to the image information to bring another image characteristic quantity of the plurality of image characteristic quantities closer to a corresponding reference value, and the ending condition includes having applied correction with all of the plurality of image characteristic quantities.

7. The code reading device of claim 6, wherein the two-dimensional code includes a timing code region in which white rectangular regions of a minimum unit constituting the two-dimensional code and black rectangular regions of the minimum unit are alternately disposed with equal spacing, and which identifies coordinates within the two-dimensional code, and a position detection pattern region in which a white rectangular region is contained in a first black rectangular region, and a second black rectangular region is contained in the white rectangular region, and which represents a position of the two-dimensional code image, a first region of the plurality of pre-specified regions is the whole of the image information, and a corresponding first reference value is a ratio of pixel numbers of white regions and black regions represented by the image information being approximately 1:1, a second region of the plurality of pre-specified regions includes the timing code region, and a corresponding second reference value is a ratio of pixel numbers of white regions and black regions represented by the image information that represents the timing code region being approximately 1:1, and a third region of the plurality of pre-specified regions includes the position detection pattern region, and a corresponding third reference value is ratios of pixel numbers, represented by image information that represents a portion reaching from one end portion of the position detection pattern region through a center thereof to another end portion thereof, of one width of the first black rectangular region, one width of the white rectangular region, a width of the second black rectangular region, another width of the white rectangular region, and another width of the first black rectangular region being approximately 1:1:3:1:1.

8. The code reading device of claim 1, wherein the derivation section derives a plurality of image characteristic quantities for a plurality of different pre-specified regions of the image information, and the correction section applies correction to bring one image characteristic quantity of the plurality of image characteristic quantities closer to a corresponding reference value by one of broadening processing which broadens black regions represented by the image information and narrowing processing which narrows black regions represented by the image information, ends the correction with this image characteristic quantity when an increase/reduction amount of numbers of the black pixels exceeds a predetermined value, then applies correction to bring another image characteristic quantity of the plurality of image characteristic quantities closer to a corresponding reference value, and ends correction when correction with all of the plurality of image characteristic quantities has ended.

9. A computer readable medium storing a program causing a computer to execute a process for code reading, the process comprising:

reading a two-dimensional code image and acquiring image information representing the two-dimensional code image;

deriving an image characteristic quantity representing a ratio between a number of pixels of a white region and a number of pixels of a black region for a pre-specified region of the acquired image information;

on the basis of a result of comparison of the derived image characteristic quantity with a reference value corresponding to the pre-specified region, applying correction to the image information to at least one of increase or decrease the number of pixels of the white region or the number of pixels of the black region to bring the image characteristic quantity closer to the reference value;

decoding information which has been coded and recorded in the image information; and if the decoding of the corrected image information fails, repeatedly applying correction to at least one of increase or decrease the number of pixels of the white region or the number of pixels of the black region while changing an increase/decrease amount so as to bring the image characteristic quantity closer to the reference value with respect to the image information, and stopping repeatedly applying the correction when the increase/decrease amount exceeds a pre-specified value.

10. The computer readable medium of claim 9, wherein the application of correction includes applying correction to bring the image characteristic quantity closer to the reference value by one of broadening processing which broadens black regions represented by the image information and narrowing processing which narrows black regions represented by the image information.

11. A code reading method comprising:

reading a two-dimensional code image and acquiring image information representing the two-dimensional code image;

deriving an image characteristic quantity representing a ratio between a number of pixels of a white region and a number of pixels of a black region for a pre-specified region of the acquired image information;

on the basis of a result of comparison of the derived image characteristic quantity with a reference value corresponding to the pre-specified region, applying correction to the image information to at least one of increase or decrease the number of pixels of the white region or the number of pixels of the black region to bring the image characteristic quantity closer to the reference value;

decoding information which has been coded and recorded in the image information; and if the decoding of the corrected image information fails, repeatedly applying correction to at least one of increase or decrease the number of pixels of the white region or the number of pixels of the black region while changing an increase/decrease amount so as to bring the image characteristic quantity closer to the reference value with respect to the image information, and stopping repeatedly applying the correction when the increase/decrease amount exceeds a pre-specified value.

* * * * *